BIDIRECTIONAL TRANSMISSION AMPLIFIER

Filed Aug. 1, 1961 2 Sheets-Sheet 1

INVENTORS
LLOYD A. JOHNSON
DONALD E. MARPE
BY Herbert F. Somermeyer
ATTORNEY

BIDIRECTIONAL TRANSMISSION AMPLIFIER

Filed Aug. 1, 1961 2 Sheets-Sheet 2

INVENTORS
LLOYD A. JOHNSON
DONALD E. MARPE
BY Herbert F. Somermeyer
ATTORNEY 3,170,038

BIDIRECTIONAL TRANSMISSION AMPLIFIER

Lloyd A. Johnson, Richfield, and Donald E. Marpe, Bloomington, Minn., assignors to Sperry Rand Corporation, New York, N.Y., a corporation of Delaware Filed Aug. 1, 1961, Ser. No. 128,549
11 Claims. (Cl. 178—71)

This invention relates to electrical transmisison line systems and has particular reference to a class of such systems that provides bidirectional transmission of logical signals over a coaxial cable.

In the utilization of electronic data processing systems it is often necessary to transmit digital signals over extended distances from one element, such as the computer, to another element, such as the memory. Due to the high speed, short duration of digital signals of present day electronic data processing systems it has become increasingly difficult to transmit such signals over conventional wiring conductors and cabling. Consequently, increased use is being made of high frequency coaxial cables. Due to the extended distances of transmission and small signals levels of logical signals, signals received at the receiving end of a conventional conductor transmission line become attenuated in their transmission thereto and are received with excessively high signal to noise ratios. With the use of coaxial cables for the interconnection of elements of an electronic data processing system and for the connection of one such element to a unit of peripheral equipment, the size and space occupied by interconnecting cabling can achieve a substantial dimension. Space saving thus becomes a serious problem. It is, therefore, necessary to utilize a single coaxial cable for as many purposes as possible, utilizing switching means at both receiving and transmitting terminals to achieve bidirectional transmission.

The primary object of this invention, therefore, is to provide a transmission system which may be used with an electronic data processing system whereby digital signals are transmitted over a coaxial cable in a bidirectional sense and which utilizes diode gating at either end of the transmission line to control the transmission and reception of logical signals.

Another object of this invention is to provide a method for the transmission and reception of electrical information pulses over distances greater than those normally possible with standard logical input-output circuits.

A still further object of this invention is to provide a transmisison amplifier which will transmit standard computer signal levels using standard building block input-output circuitry over extended distances.

These and other more detailed and specific objectives will be disclosed in the course of the following specification, reference being had to the accompanying drawings in which.

Figure 1:
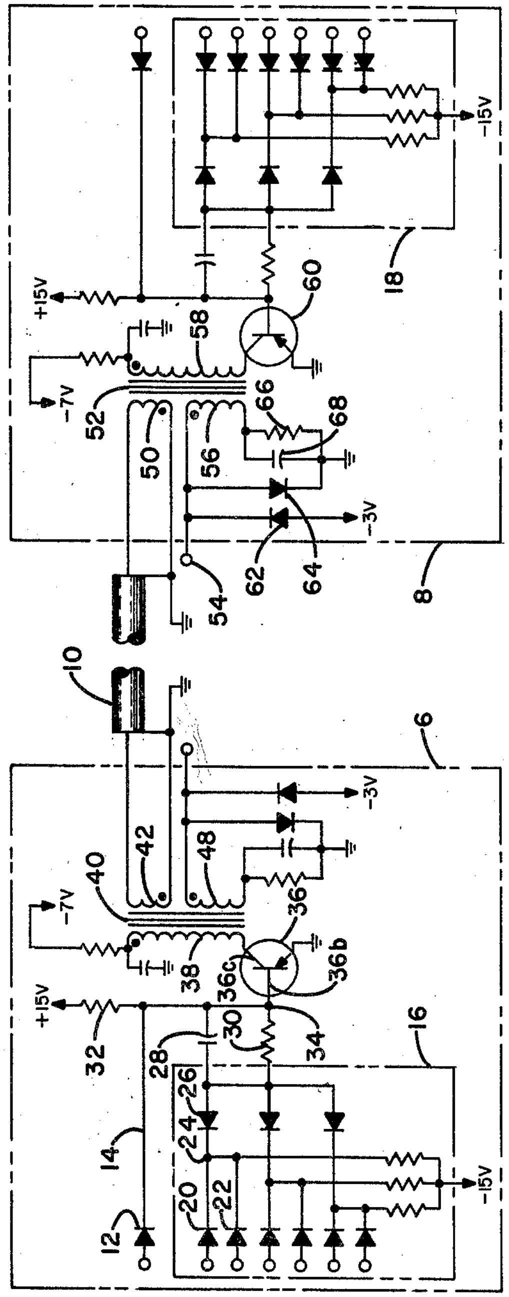
FIG. 1 illustrates an exemplary embodiment of this invention wherein there is illustrated a bidirectional transmission system utilizing substantially similar amplifying circuits at either end of a coaxial cable.

An exemplary embodiment of this invention is illustrated in FIG. 1 wherein there is illustrated a bidirectional transmission system employing substantially similar amplifying circuits of boxes 6 and 8 at the ends of coaxial cable transmission line 10. Bidirectional amplifying circuits of boxes 6 and 8 which are utilized at either end of the transmission line may be standard building block elements of an electronic data processing system utilizing the base clocking circuit of diode 12 and conductor 14 and that operate as transformer-coupled saturated transistor amplifiers. The AND/OR diode inputs of boxes 16 and 18 provide a means of gating information into the amplifiers from as many as six different sources. This embodiment provides an output signal level of approximately −3 volts at the output terminal of the receiving amplifier when one or more inputs ANDS are satisfied and when the clocking signal on the anode of diode 12 is at its −1.5 volt level.

In order to facilitate an understanding of the operation of this invention as exemplified by FIGS. 1–6, certain typical voltage source levels will be assumed and are noted on the above noted figures. It should be understood that the principles of operation of this circuit may be present in circuits having a wide range of individual specifications so that the particular values assumed are for illustrative purposes only and should not be construed as a limitation.

Figure 4:
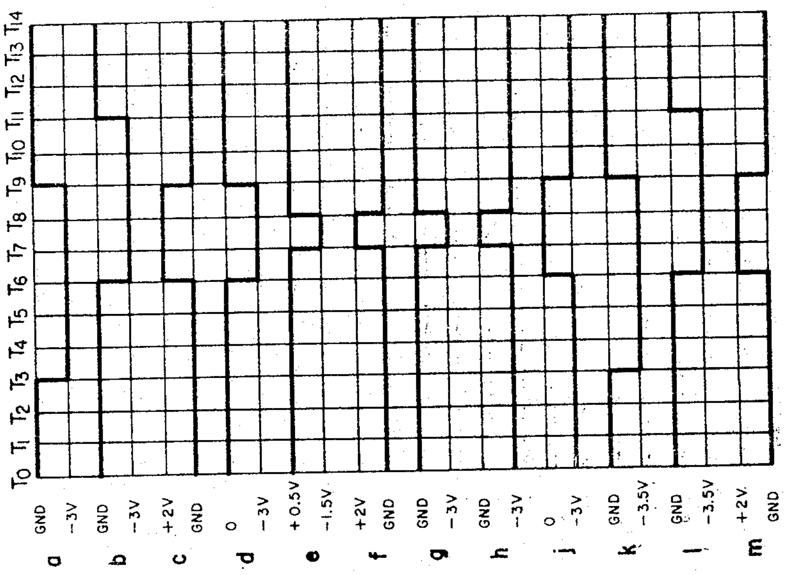
FIG. 4 illustrates typical signal wave forms of the embodiments of FIGS 1, 2 and 3.

With the clocking circuit of diode 12 and conductor 14 not utiilzed the following circuit functions occur. Initially, it can be stated that the circuits of boxes 16 and 18 of FIG. 1 are conventional negative AND/OR diode logic circuits. When all of the diodes of any AND circuits of box 16 have a signal of −3 volts presented at their anodes, i.e., when the AND circuit is enabled—for example, on diodes 20 and 22—the voltage presented at the OR input of box 16 at node 24 is approximately −3 volts. The circuit of diode 26, capacitor 28, resistor 30 and resistor 32 under these conditions presents at node 34 a voltage of approximately −0.85 volt. This voltage, which is impressed upon base 36*b* of transistor 36 maintains transistor 36 in its conducting mode, passing a current signal through winding 38 of nonsaturating transformer 40. Under these conditions, the duration of the current pulse flowing through transformer 40 is determined by the period of the concurrence of the −3 voltage signals on the anodes of diodes 20 and 22. Reference to FIG. 4 illustrates the time relationship of these signals and the resulting output at winding 42 of transformer 40. Wave forms *a* and *b* of FIG. 4 represent the signal inputs presented at diodes 20 and 22 respectively with wave form *c* of FIG. 4 illustrating the resulting output at winding 42 of transformer 40.

When the clocking circuit is utilized, the following circuit functions occur. Under the above conditions with an AND condition fulfilled on diodes 20 and 22, i.e., when the AND circuit formed of diodes 20 and 22 is enabled, and with the clock signal of +0.5 volt presented on the anode of diode 12 which condition presents a signal of approximately +0.1 volt at node 34, base 36*b* of transistor 36 is reverse biased holding transistor 36 in its nonconducting mode. When a clock pulse of −1.5 volts is presented at the anode of diode 12, concurrent with the AND condition fulfilled on diodes 20 and 22, diode 12 becomes reverse biased, which permits the combined effect of the concurrent signals of wave form *a*, *b*, and *e* of FIG. 4 to determine the output of transistor 36 with the length of clock signal wave form *e* of FIG. 4 determining the length of output signal wave form *f* of FIG. 4 at winding 42 of transformer 40. In the illustrated embodiment of FIG. 1 and with the voltage sources assumed, the voltage developed across winding 38 of transformer 40 when transistor 36 is in its conducting mode is approximately +6.0 volts. In this embodiment the turns ratios of the windings of transformer 40 are $$\frac{N_{38}}{3}:\frac{N_{42}}{1}:\frac{N_{48}}{1.83}$$

where N represents the number of turns of windings 38, 42 and 48 of transformer 40. For this ratio of winding turns and with the signal wave forms above described, the output signal impressed upon cable 10 through winding 42 of transformer 40 is approximately +2.0 volts as exemplified by wave form *f* of FIG. 4. The winding turns ratios of transformer 40 are such as to match the load impedance of collector 36*c* of transistor 36 to cable 10 which, in the illustrated embodiment of FIG. 1 is a conventional 50 ohm coaxial cable, and to provide the proper signal level at output terminal 54 to operate the associated circuitry coupled thereto.

When any one or more of the diodes of all ANDS of box 16 have a signal of ground potential presented at their anodes—for example, on diode 20—the voltage presented at the OR input of box 16 and node 24 is approximately −0.5 volt. The circuit of diode 26, capacitor 28, resistor 30 and resistor 32 under these conditions presents at node 34 a voltage of approximately +0.5 volt. This voltage, which is impressed upon base 36*b* of transistor 36, maintains transistor 36 in its nonconducting mode, passing no current signal through winding 38 of transformer 40. Under these conditions, there is no ouptput signal induced in cable 10 through winding 42 of transformer 40.

The opposite end of cable 10 terminates at winding 50 of nonsaturating transformer 52 which, in the illustrated embodiment of FIG. 1 is substantially similar to transformer 40. Winding 50 of transformer 52 couples cable 10 to the external load which is coupled to terminal 54 of winding 56 of transformer 52. The output circuit of winding 56 under the signal conditions in cable 10 as exemplified by wave forms *c* or *f* of FIG. 4 provides an output signal at terminal 54 as exemplified by wave forms *d* or *g* of FIG. 4 respectively. These output signals are a negative output pulse of −3.0 volts whose duration is determined by the clock pulse of wave form *e* of FIG. 4, if the clocking circuit is utilized, or by the duration of the concurrent imposition of the signals impressed on diodes 20 and 22 as exemplified by the signals of wave forms *a* and *b* of FIG. 4. Winding 58 of transformer 52 appears as an open circuit to the signals of wave forms *c* and *f* of FIG. 4 when transistor 60 is in its nonconducting mode as it is assumed that no AND condition is fulfilled on any AND circuit of box 8 when the circuit of box 6 is transmitting through cable 10 to box 8.

Figure 3:
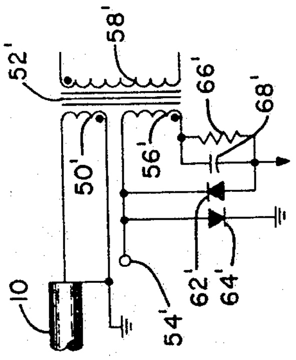
FIG. 3 illustrates an exemplary embodiment of an amplifying circuit that may be used as an auxiliary terminating circuit for a undirectional transmission system providing a positive going output signal.

When an alternate output circuit furnishing an output pulse of ground potential is required, the output circuit of FIG. 3 may be utilized. In this configuration, transformer 52′ and windings 50′, 56′ and 58′ are substantially similar to transformer 52 and windings 50, 56 and 58 respectively. The basic differences between the output circuits of windings 56 and 56′ are as follows. Winding 56′ is coupled in an opposite magnetic sense to that of winding 56 with respect to the magnetic sense of windings 58′ and 58 as denoted by the dots placed near the respective windings of FIGS. 1 and 3. Additionally, the connections of diodes 62 and 64 are the same as those of 62′ and 64′, but with their anode polarities reversed, with the resistor 66′-capacitor 68′ combination coupled to a source of −3 volts while the resistor 66-capacitor 68 combination is coupled to a source of ground potential. This reversal of voltage source levels, diode anode polarities and transformer winding sense results in output signal wave forms *d* and *g* of FIG. 4 for the output circuit of winding 56 and in output signal wave forms *j* and *h* for the output circuit of winding 56′.

Figure 2:
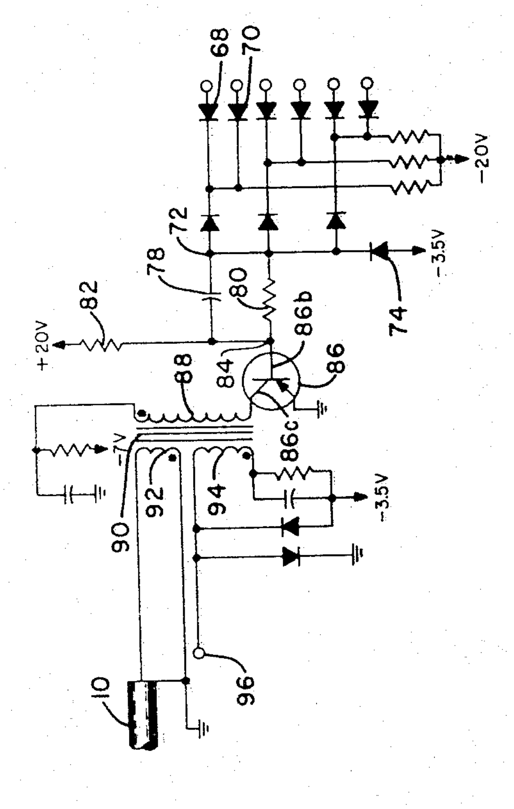
FIG. 2 illustrates an exemplary embodiment of an amplifying circuit that may be used as an auxiliary terminating circuit for a bidirectional transmisison system.

As noted hereinbefore, the exemplary embodiment of FIG. 1 illustrates one embodiment of this invention wherein the amplifying circuits of boxes 6 and 8, which are at either end of cable 10, are substantially similar. As disclosed in FIG. 3, an alternate output signal may be employed wherein output signals of positive or negative voltage levels may be utilized as required by the load coupled to output terminal 54. FIG. 2 discloses an amplifying circuit different from that utilized in FIG. 1 and which may be used in lieu of the amplifying circuit of box 8 of FIG. 1 to accommodate an element of an electronic data processing system which operates on signal voltage levels different from that utilized in the element in which the amplifying circuit of box 6 is employed. The circuit of FIG. 2 thus accomplishes a coupling of two elements of an electronic data processing system operating on logical signals of different voltage levels.

When all of the diodes of any AND circuit of the circuit of FIG. 2 have a signal of −3.5 volts presented at their anodes—for example, on diodes 68 and 70—the voltage presented at the OR output of the circuit of FIG. 2 and node 72 is approximately −3.5 volts due to the clamping action of diode 74. The circuit of capacitor 78, resistor 80 and resistor 82 under these conditions presents at node 84 a voltage of approximately −0.85 volt. This voltage, which is impressed upon base 86*b* of transistor 86, maintains transistor 86 in its conducting mode, passing a current signal through winding 88 of transformer 90. Under these conditions, the duration of the current pulse flowing through transformer 90 is determined by the period of the concurrence of the −3.5 voltage signals on the anodes of diodes 68 and 70. Reference to FIG. 4 illustrates the time relationship of these signals and the resulting output at winding 92 of transformer 90. Wave forms *k* and *l* of FIG. 4 represent signal inputs presented on diodes 68 and 70 respectively with wave form *m* of FIG. 4 illustrating the resulting output of winding 92 of transformer 90 under the above conditions. In the illustrated embodiment of FIG. 2 and with the voltage sources assumed, the voltage developed across winding 88 of transformer 90 when transistor 86 is in its conducting mode, is approximately +6.0 volts. In this embodiment, the turns ratios of the windings of transformer 90 are $$\frac{N_{88}}{3}:\frac{N_{92}}{1}:\frac{N_{94}}{2.167}$$

where N represents the number of turns of windings 88, 92 and 94 of transformer 90. With this ratio of winding turns and with the signal functions above described, the output signal impressed upon cable 10 through winding 92 of transformer 90 is approximately +2.0 volts. The winding turns ratios of transformer 90 are such as to match the load impedance of collector 86*c* of transistor 86 to cable 10 which, in the illustrated embodiment of FIG. 2, is a conventional 50 ohm coaxial cable, and to provide the proper signal level at output terminal 96 to operate the associated circuitry coupled thereto.

When any one or more of the diodes of all ANDS of the circuit of FIG. 2 have a signal of ground potential presented at their anodes—for example, on diode 68, the voltage presented at the OR output of the circuit of FIG. 2 and node 72 is approximately −0.5 volt. The circuit of capacitor 78, resistor 80 and resistor 82 under these conditions presents at node 84 a voltage of approximately +0.5 volt. At this time diode 74 is reverse biased and is effectively inoperative. This voltage, which is impressed upon base 86*b* of transistor 86, maintains transistor 86 in its nonconducting mode, passing no current signal through winding 88 of transformer 90. Under these conditions, there is no output signal induced in cable 10 through winding 92 of transformer 90.

It is apparent to one of ordinary skill in the art that a slight modification of the illustrated embodiment of FIGS. 1 and 2 will effectuate a unidirectional transmission system. As pointed out in the above description of FIG. 1, winding 58 appears as an open circuit to a signal impressed upon winding 50 when transistor 60 is in its nonconducting mode. Thus, when a unidirectional transmission system is desired a transformer, such as transformer 52 having only windings 50 and 56 will permit reception of a signal upon winding 50 and present an output signal at terminal 54. In a similar manner, the input circuits associated with winding 58 of box 8 and with winding 58' of FIG. 3 may be deleted using a two winding transformer instead of the illustrated three winding embodiments. Accordingly, when a unidirectional transmission system is desired, the transmitting amplifying circuit—for example, box 6 of FIG. 1 if box 8 is converted to a unidirectional transmission system—would not require the associated output circuit—for example, the circuit associated with winding 48. This embodiment of a unidirectional transmission system as a modification of FIG. 1 would then exclude the circuitry associated with winding 48 of box 6 and the circuitry associated with winding 58 of box 8. As discussed thereinbefore, the circuits of boxes 6 and 8 as illustrated in the exemplary embodiment of FIG. 1 utilize the clocking circuit of diode 12 and conductor 14 coupled to the base 36*b* of transistor 36 to determine the transistor output signal wave form. In the past when a clocking signal has been utilized to control an output signal, it has been coupled to the base of the transistor through the associated logic circuit. This arrangement requires that the clocking circuit accommodate a large current flow to maintain the transistor in the nonconducting mode. The clocking circuit of FIG. 1 in contrast is coupled to the circuit at a point electrically intermediate the transistor and the logic circuit. This provides many advantages, the principal one being the ability to control an output signal with a low level, low power, externally controlled voltage or clocking signal.

As discussed in the explanation of the operation of FIG. 1, the clocking circuit of diode 12 and conductor 14 couples base 36*b* of transistor 36 to a clocking signal of wave form *e* of FIG. 4. This signal provides two voltage levels; one just sufficient to reverse bias the base-emitter junction, and a second just sufficient to forward bias the base-emitter junction. When combined with the conventional common-emitter configuration, i.e., with the emitter grounded, this clocking signal can assume a wave form of small incremental changes, usually of the magnitude of one-half to two volts above or below ground potential.

Wave form *e* of FIG. 4 is an example of the magnitude of the clocking signal required to control a transistor which is coupled to a logic circuit input. As described in wave form *e* of FIG. 4, the signal level required to hold PNP type transistor 36 in its nonconducting mode and to overcome the negative output of the logic circuit of box 16 is only +0.5 volt while the signal level required to permit transistor 36 to pass into its conducting mode as determined by the negative output of the logic circuit of box 16 is only −1.5 volts. As discussed hereinbefore, diode 12 is effectively inoperative when the voltage impressed on the anode of diode 12 is more negative than the potential at node 34 which is determined by the output of the logic circuit of box 16. Under this condition diode 12 is reverse biased isolating the clocking signal source from the transistor base. The operating mode of transistor 36 will then be determined by the output voltage of box 16.

Figure 5:
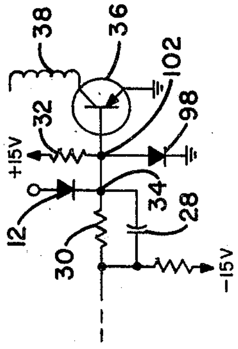
FIG. 5 illustrates a modified embodiment of the base clocking concept of FIG. 1.

FIG. 5 illustrates another embodiment of the base clocking concept of FIG. 1 wherein diode 98 is added to the transistor base circuit of FIG. 1. Diode 98 in this embodiment clamps base 36*b* of transistor 36 to a source of ground potential providing a maximum of approximately +0.5 volt, i.e., the voltage drop across diode 98 at node 102 which is directly coupled to base 36*b* of transistor 36 which protects base 36*b* of transistor 36 when provided signals having substantially larger voltage swings from the logic circuit of box 16 or the clock input.

Figure 6:
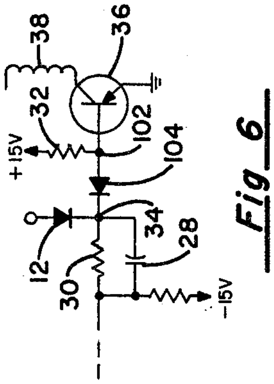
FIG. 6 illustrates another modified embodiment of the base clocking concept of FIG. 1.

FIG. 6 illustrates another embodiment of the base clocking concept of FIG. 1 wherein diode 104 is added to the transistor base circuit of FIG. 1 intermediate node 34 and node 102. Diode 104 is added to this embodiment to assure that the clocking signal source will not be required to provide the current necessary to drive transistor 36 out of saturation when clocking signal wave form *e* of FIG. 4 moves from the −1.5 volt level into the +0.5 volt level. With transistor 36 in its conducting mode and with the clocking signal moving into the +0.5 volt level the clock tends to reverse bias diode 104 isolating the clocking signal source from the transistor base circuit. Resistor 32 acts as a pull-up resistor to pull the voltage level of node 102 towards the positive voltage level of the +15 volt source. This pull-up action of resistor 32 utilizes the +15 volt source as the current source which drives transistor 36 out of saturation and into its nonconducting mode. Diode 104 again becomes forward biased when the voltage level of node 102 becomes more positive than the voltage level of node 34 which limits the base voltage of transistor 36 in its nonconducting mode.

It is understood that suitable modifications may be made in the structure as disclosed provided such modifications come within the spirit and scope of the appended claims.

Having now, therefore, fully illustrated and described our invention, what we claim to be new and desire to protect by Letters Patent is:

1. A transmission amplifying system comprising: first and second amplifying means; said first and second amplifying means each including input means, output means, and input/output means; a transmission line coupling said first amplifying means input/output means to said second amplifying means input/output means; said second amplifying means output means responsive to a first predetermined input signal impressed upon said first amplifying means input means; said first amplifying means output means responsive to a second predetermined input signal impressed upon said second amplifying means input means; said first amplifying means further including a nonsaturating transformer means including at least three winding means; first winding means; second winding means coupled to said output means; third winding means coupled to said input/output means; an active element having at least three electrodes designated the base electrode, the collector electrode, and the emitter electrode; said first winding means coupling said collector electrode to a first voltage source; means coupling said emitter electrode to a second voltage source; means coupling said base electrode to said input means; said input means including at least one input terminal.

2. The apparatus of claim 1 wherein said first amplifying means further includes a first unilateral impedance means coupling a first terminal of said second winding means to a third voltage source; a parallel combination of a capacitor and a resistor coupling a second terminal of said second winding means to a fourth voltage source; a second unilateral impedance means coupling said first terminal of said second winding means to said fourth voltage source.

3. The apparatus of claim 1 further including means for generating a clock signal and wherein said first amplifying means further includes at least one additional input terminal for coupling said clock signal to said base electrode; a third unidirectional impedance means electrically intermediate said clock signal input terminal and said base electrode; said active element providing an output signal to said first winding means only upon the concurrent imposition of said clock signal upon said clock signal input terminal and said first predetermined input signal upon said first amplifying means input means.

4. A transmission amplifying system comprising: first and second amplifying means; said first and second amplifying means each including input means, gating means, and output means; first clocking means coupling a first clock signal to said first amplifying means gating means;

a transmission line coupling said first amplifying means output means to said second amplifying means input means; said second amplifying means output means responsive to a first predetermined input signal impressed upon said first amplifying means input means when said first clock signal is coupled to said first amplifying means gating means; said first amplifying means further including a nonsaturating transformer means including at least two winding means; first winding means; second winding means coupled to said output means; an active element having at least three electrodes designated the base electrode, the collector electrode and the emitter electrode; said first winding means coupling said collector electrode to a first voltage source; means coupling said emitter electrode to a second voltage source; means coupling said base electrode to said input means; said input means including a diode logic circuit.

5. Amplifying means comprising: input means; output means; input/output means; nonsaturating transformer means including at least three winding means, first winding means, second winding means coupled to said output means, third winding means coupled to said input/output means; said output means responsive to a first predetermined input signal impressed upon said input/output means; said input/output means responsive to a second predetermined input signal impressed upon said input means; an active element having at least three electrodes designated the base electrode, the collector electrode, and the emitter electrode; said first winding means coupling said collector electrode to a first voltage source; means coupling said emitter electrode to a second voltage source; means coupling said base electrode to said input means; said input means including at least one input terminal.

6. The apparatus of claim 5 further including means for generating a clock signal and further including at least one additional input terminal for coupling said clock signal to said base electrode; a first unidirectional impedance means electrically intermediate said clock signal input terminal and said base electrode; said active element providing an output signal to said input/output means only upon the concurrent imposition of said clock signal upon said clock signal input terminal and said second predetermined input signal upon said first amplifying means input means.

7. The apparatus of claim 5 further including a second unilateral impedance means coupling a first terminal of said second winding means to a third voltage source; a parallel combination of a capacitor and a resistor coupling a second terminal of said second winding means to a fourth voltage source; a third unilateral impedance means coupling said first terminal of said second winding means to said fourth voltage source.

8. A transmission amplifying system comprising: first and second amplifying means each including input means and output means; a transmission line coupling said first amplifying means output means to said second amplifying means input means; said first amplifying means input means including diode logic means and gating means; clock signal generating means coupling a clock signal to said gating means; the coupling of said clock signal to said gating means enabling the output of said diode logic means producing a predetermined signal at said second amplifying means output means.

9. A transmission amplifying system comprising: first and second amplifying means; said first and second amplifying means each including input means and output means; a transmission line coupling said first amplifying means output means to said second amplifying means input means; said second amplifying means output means responsive to a first predetermined input signal impressed upon said first amplifying means input means; said first amplifying means further including a nonsaturating transformer means including at least first, second and third winding means; said second winding means coupled to said first amplifying means output means; an active element having at least three electrodes designated the base electrode, the collector electrode and the emitter electrode; said first winding means coupling said collector electrode to a first voltage source; means coupling said emitter electrode to a second voltage source; means coupling said base electrode to said first amplifying means input means; said first amplifying means input means including at least one input terminal; a first unilateral impedance means coupling a first terminal of said third winding means to a third voltage source; a parallel combination of a capacitor and a resistor coupling a second terminal of said third winding means to a fourth voltage source; a second unilateral impedance means coupling said first terminal of said third winding means to said fourth voltage source.

10. A transmission amplifying system comprising: first and second amplifying means each including input means, output means, gating means and input/output means; a transmission line intercoupling each of said input/output means; each of said input means including diode logic means; first clock signal generating means coupling a first clock signal to said first amplifying means gating means; the concurrent coupling of said first clock signal to said first amplifying means gating means and the enabling of said first amplifying means diode logic means producing a first predetermined signal at said second amplifying means output means; second clock signal generating means coupling a second clock signal to said second amplifying means gating means; the concurrent coupling of said second clock signal to said second amplifying means gating means and the enabling of said second amplifying means diode logic means producing a second predetermined signal at said first amplifying means output means.

11. Amplifying means comprising: input means; output means; nonsaturating transformer means including at least two winding means, first winding means, second winding means coupled to said output means; an active element having at least three electrodes designated the base electrode, the collector electrode, and the emitter electrode; said first winding means coupling said collector electrode to a first voltage source; means coupling said emitter electrode to a second voltage source; means coupling said base electrode to said input means; clocking means for generating a clock signal; said input means including a diode logic circuit and at least one additional input terminal for coupling said clock signal to said base electrode; a first unidirectional impedance means electrically intermediate said clock signal input terminal and said base electrode; said active element providing an output signal to said output means only upon the concurrent imposition of said clock signal upon said clock signal input terminal and the enabling of said diode logic circuit.

References Cited in the file of this patent

UNITED STATES PATENTS

| | | |
|---|---|---|
| 1,690,153 | Abraham | Nov. 6, 1928 |
| 2,947,816 | Hysko | Aug. 2, 1960 |

OTHER REFERENCES

Publication: "General Electric Transistor Manual," by the General Electric Company; fourth edition, copyrighted in 1959; pages 128–135.